United States Patent
Lee et al.

(10) Patent No.: US 11,829,809 B2
(45) Date of Patent: Nov. 28, 2023

(54) METHOD, SYSTEM, AND NON-TRANSITORY COMPUTER-READABLE RECORD MEDIUM FOR MANAGING EVENT MESSAGES AND SYSTEM FOR PRESENTING CONVERSATION THREAD

(71) Applicant: LINE Plus Corporation, Seongnam-si (KR)

(72) Inventors: Seung Won Lee, Seongnam-si (KR); Jihun Im, Seongnam-si (KR); Hyojin Lim, Seongnam-si (KR); Jun Hyuk Park, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/863,955

(22) Filed: Jul. 13, 2022

(65) Prior Publication Data

US 2022/0350681 A1    Nov. 3, 2022

Related U.S. Application Data

(63) Continuation of application No. 16/822,825, filed on Mar. 18, 2020, now Pat. No. 11,416,315.

(30) Foreign Application Priority Data

Apr. 15, 2019    (KR) .................. 10-2019-0043588

(51) Int. Cl.
*G06F 9/54*    (2006.01)
*H04L 51/04*   (2022.01)
*H04L 51/18*   (2022.01)
*H04L 51/216*  (2022.01)
*H04L 51/224*  (2022.01)

(52) U.S. Cl.
CPC .............. *G06F 9/542* (2013.01); *H04L 51/04* (2013.01); *H04L 51/18* (2013.01); *H04L 51/216* (2022.05); *H04L 51/224* (2022.05)

(58) Field of Classification Search
None
See application file for complete search history.

(56) References Cited

U.S. PATENT DOCUMENTS

| | | |
|---|---|---|
| 2012/0323928 A1 | 12/2012 | Bhatia |
| 2015/0207765 A1 | 7/2015 | Brantingham et al. |
| 2016/0301639 A1* | 10/2016 | Liu .................. H04L 51/52 |
| 2016/0330150 A1* | 11/2016 | Joe .................. G06F 3/0486 |
| 2018/0083894 A1 | 3/2018 | Fung et al. |
| 2018/0309706 A1 | 10/2018 | Kim et al. |
| 2018/0367484 A1 | 12/2018 | Rodriguez et al. |
| 2020/0097544 A1* | 3/2020 | Alexander ............. G06N 3/045 |

FOREIGN PATENT DOCUMENTS

KR    10-2002-0074304 A    9/2002

* cited by examiner

*Primary Examiner* — Charles E Anya
(74) *Attorney, Agent, or Firm* — Harness, Dickey & Pierce, P.L.C.

(57) ABSTRACT

Methods, systems, and non-transitory computer-readable record media for managing event messages may be provided. A message management method may include generating, by at least one processor, an event related to a chatroom based on an event message input from the chatroom, assigning, by the at least one processor, a reply to the event message, from among messages in the chatroom, to the event, and displaying, by the at least one processor, the reply to the event message in association with the event.

16 Claims, 12 Drawing Sheets

METHOD, SYSTEM, AND NON-TRANSITORY COMPUTER-READABLE RECORD MEDIUM FOR MANAGING EVENT MESSAGES AND SYSTEM FOR PRESENTING CONVERSATION THREAD

CROSS-REFERENCE TO RELATED APPLICATIONS

This U.S. non-provisional application is a continuation of U.S. application Ser. No. 16/822,825, filed on Mar. 18, 2020, now granted as U.S. Pat. No. 11,416,315 on Aug. 16, 2022, which claims the benefit of priority under 35 U.S.C. § 119 to Korean Patent Application No. 10-2019-0043588, filed Apr. 15, 2019, the entire contents of each of which are incorporated herein by reference in their entirety.

BACKGROUND

Technical Field

One or more example embodiments relate to methods, systems, and/or non-transitory computer readable media for managing messages.

Related Art

An instant messenger refers to software capable of sending and receiving messages or data in real time. A user may register a contact on a messenger and may exchange messages with a counterpart included in a contact list in real time.

Such a messenger function is popular in a mobile environment of a mobile communication terminal as well as a personal computer (PC).

With the increasing popularity of an instant messenger and diversity of functions provided through the instant messenger, functions of sharing a variety of information and contents such as photos, videos, files, contacts, locations, schedules, notifications, and/or votes, and interaction with other services such as a game service or a video service are supported.

SUMMARY

Some example embodiments may generate an event based on a message input from a chatroom, and may manage at least a portion of messages in the chatroom in association with the event.

According to an example embodiment, a message management method implemented by a computer system including at least one processor configured to execute computer-readable instructions included in a memory may include generating, by the at least one processor, an event related to a chatroom based on an event message input from the chatroom, assigning, by the at least one processor, a reply to the event message, from among messages in the chatroom, to the event, and displaying, by the at least one processor, the reply to the event message in association with the event.

The generating may include generating the event based on the event message input through an event registration screen on the chatroom.

The generating may include recognizing an input message as the event message in response to at least one of keywords associated with the event being included in the message input through a message input box of the chatroom or the input message being input based on a rule associated with the event.

The generating may include generating the event based on content of the event message.

The displaying may include displaying the event as a message of an event message type in the chatroom.

The displaying may include displaying the event message and the reply to the event message as a single message of the event message type.

The displaying may include displaying the event message and the reply to the event message as a single message of the event message type and displaying the event message with at least one of replies to the event message.

The message management method may further include providing, by the at least one processor, a reply screen for verifying the reply to the event message in response to a selection on a message of an event message type representing the event in the chatroom.

The generating may include setting a target in association with the event, and the message management method may further include providing, by the at least one processor, a notification of receiving the reply to the event message to the target.

The message management method may further include recommending, by the at least one processor, content or a function available as a specific reply to a specific event, in response to a selection of the specific event among events related to the chatroom.

The recommending may include providing, by the at least one processor, a list of the events related to the chatroom in response to an input of a specific symbol to a message input box of the chatroom, and displaying, by the at least one processor, a recommendation list available as the reply to the specific event on the chatroom in response to a selection of the specific event from the list of the events.

The recommending may include providing, by the at least one processor, a reply screen in response to a selection of the specific event in the chatroom, and providing, by the at least one processor, a recommend list available as the reply to the specific event through the reply screen.

Each of the events related to the chatroom may correspond to one of a plurality of event types, and the recommending may include recommending the content or the function based on one of the plurality of event types corresponding to the specific event.

According to an example embodiment, there may be provided a non-transitory computer-readable record medium storing instructions that, when executed by the at least one processor included in the computer system, cause the at least one processor to perform the aforementioned message management method.

According to an example embodiment, a computer system including at least one processor configured to execute computer-readable instructions included in a memory. The at least one processor includes generate an event related to a chatroom based on an event message input from the chatroom, assign a reply to the event message, from among messages in the chatroom, to the event, and display the reply to the event message in association with the event Further areas of applicability will become apparent from the description provided herein. The description and specific examples in this disclosure are intended for purposes of illustration only and are not intended to limit the scope of the present disclosure.

DETAILED DESCRIPTION

Figure 1:
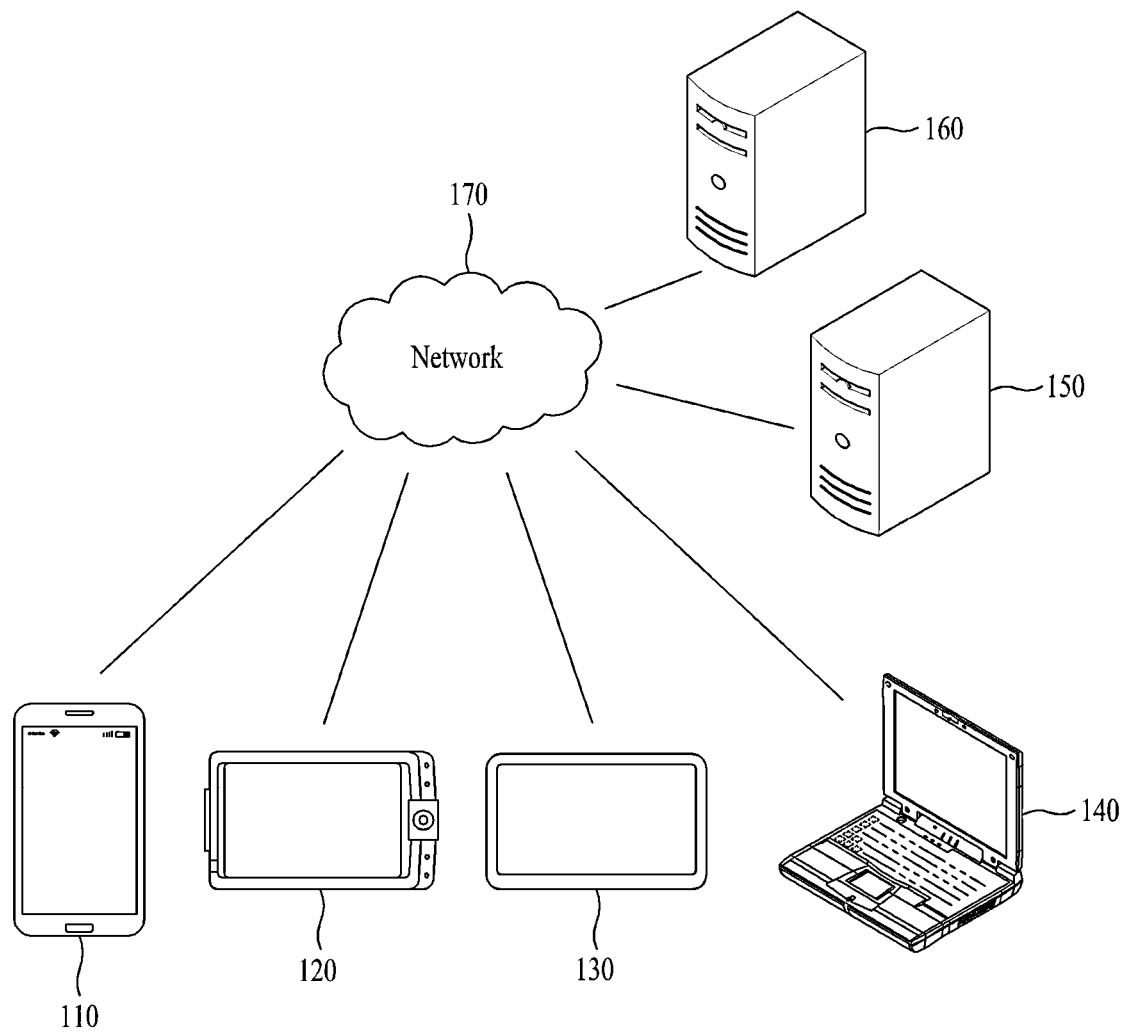
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

Example embodiments relate to technologies for managing messages.

Example embodiments including the disclosure of the present specification may assign a message in a chatroom to an event and thereby manage the message, and may effectively manage messages associated with the event and may facilitate an access to correlated information.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, or a satellite network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. For example, the server 150 may provide a service (e.g., a messaging service) intended by an application through the application as a computer program installed and executed on the plurality of electronic devices 110, 120, 130, and 140, as the first service. For example, the server 160 may provide a service that distributes a file for installing and executing the application to the plurality of electronic devices 110, 120, 130, and 140, as the second service.

Figure 2:
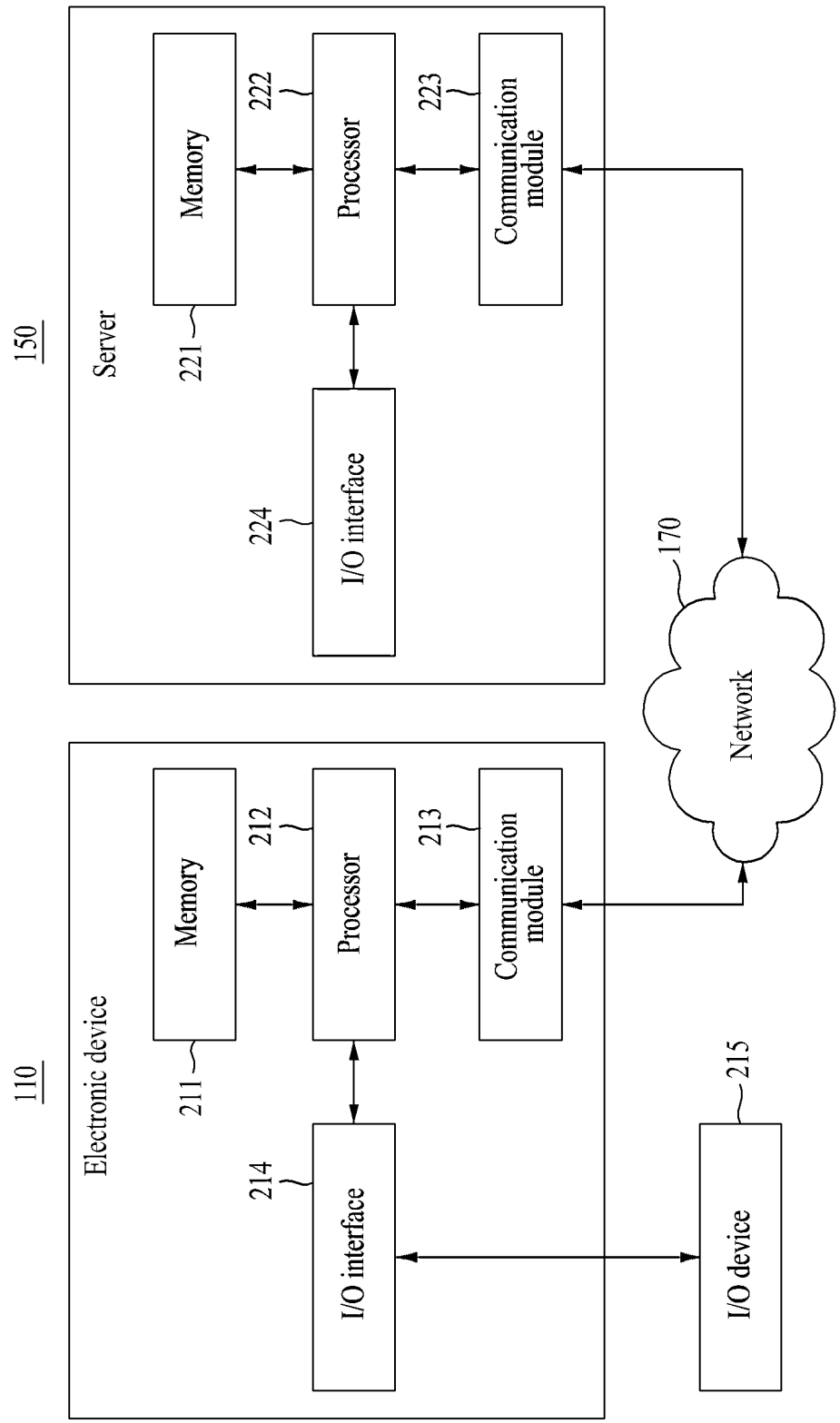
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. The other electronic devices 120, 130, and 140 or the server 160 may have the same or similar configurations as that of the electronic device 110 or that of the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memories 211, 221 may include a permanent mass storage device, such as random access memory (RAM), a read only memory (ROM), a disk drive, a solid state drive (SSD), or a flash memory, as a non-transitory computer-readable record medium. The permanent mass storage device, such as ROM, SSD, flash memory, or disk drive, may be included in the electronic device 110 or the server 150 as a permanent storage device separate from the memories 211, 221. Also, an OS or at least one program code, for example, a code for a browser installed and executed on the electronic device 110 or an application installed and executed on the electronic device 110 to provide a specific service, may be stored in the memories 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, or a memory card. According to some example embodiments, software components may be loaded to the memory 211, 221 through the communication modules 213, 223, instead of the non-transitory computer-readable record medium, over the network 170. For example, at least one program may be loaded to the memories 211, 221 based on a computer program (e.g., the application) installed by files provided over the network 170 from developers or a file distribution system (e.g., the server 160 providing an installation file of the application).

The processors 212, 222 may be configured to process instructions of a computer program by performing basic arithmetic operations, logic operations, and I/O operations. The computer-readable instructions may be provided from the memories 211, 221 or the communication modules 213, 223 to the processors 212, 222. For example, the processors 212, 222 may be configured to execute received instructions in response to the program code stored in the storage device, such as the memories 211, 221. The processors 212, 222 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The communication modules 213, 223 may provide a function for communication between the electronic device 110 and the server 150 over the network 170, and may provide a function for communication between the electronic device 110 and/or the server 150 with another electronic device, for example, the electronic device 120 or another server (e.g., the server 160). For example, the processor 212 of the electronic device 110 may transfer a request created based on a program code stored in the storage device (e.g., the memory 211) to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and the content, the file, etc., may be stored in a storage medium (e.g., the permanent storage device further includable in the electronic device 110).

The I/O interface 214 may be a device used for interface with an I/O apparatus 215. For example, an input device may include a device, such as a keyboard, a mouse, a microphone, or a camera, and an output device may include a device, such as a display, a speaker, or a haptic feedback device. As another example, the I/O interface 214 may be a device for interface with an apparatus in which an input function and an output function are integrated into a single function, such as a touchscreen. The I/O apparatus 215 may be configured as a single device with the electronic device 110. The I/O interface 224 of the server 150 may be a device for interface with an apparatus (not shown) for input or output that may be connected to the server 150 or included in the server 150. For example, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a smaller or greater number of components than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, or a database (DB). For example, if the electronic device 110 is a smartphone, the electronic device 110 may be configured to further include a variety of components, for example, an acceleration sensor, a gyro sensor, a camera module, various physical buttons, a button using a touch panel, an I/O port, or a vibrator for vibration, which are generally included in the smartphone.

Hereinafter, methods and systems for assigning a message to an event and thereby managing messages according to some example embodiments are described.

When a large number of persons join a chatroom or conversations are actively ongoing in the chatroom, many messages unread by a user may be accumulated. Further, a user that joins the chatroom relatively late may need to read messages from the beginning.

Reading such accumulated messages from the beginning may not be regarded as a convenient conversation-based service. Accordingly, technology capable of collecting and managing messages with respect to a specific event in a chatroom is desired.

The term "chatroom" used herein may refer to an interface screen for providing messages exchanged between users. For example, an interface screen for displaying messages exchanged through a communication session established between accounts of users in a messenger or a social network service (SNS), an interface screen for displaying messages exchanged with a counterpart of a corresponding telephone number based on the telephone number using a text function such as a short message service (SMS) or a multimedia message service (MMS) may correspond to a representative example of the chatroom.

Although the following description is made based on an example of a chatroom of a messenger, it is provided as an example only. Any type of conversation-based interfaces of a service that allows a plurality of users to join and a new user to frequently join based on an account or a telephone number of a user may apply.

Figure 3:
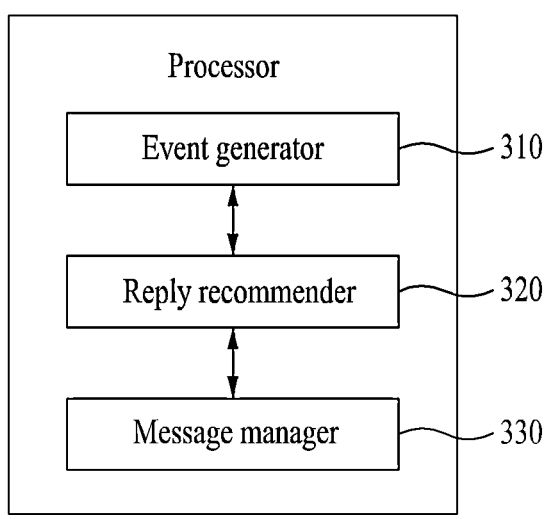
FIG. 3 is a diagram illustrating an example of components includable in a processor of an electronic device according to at least one example embodiment.
Figure 4:
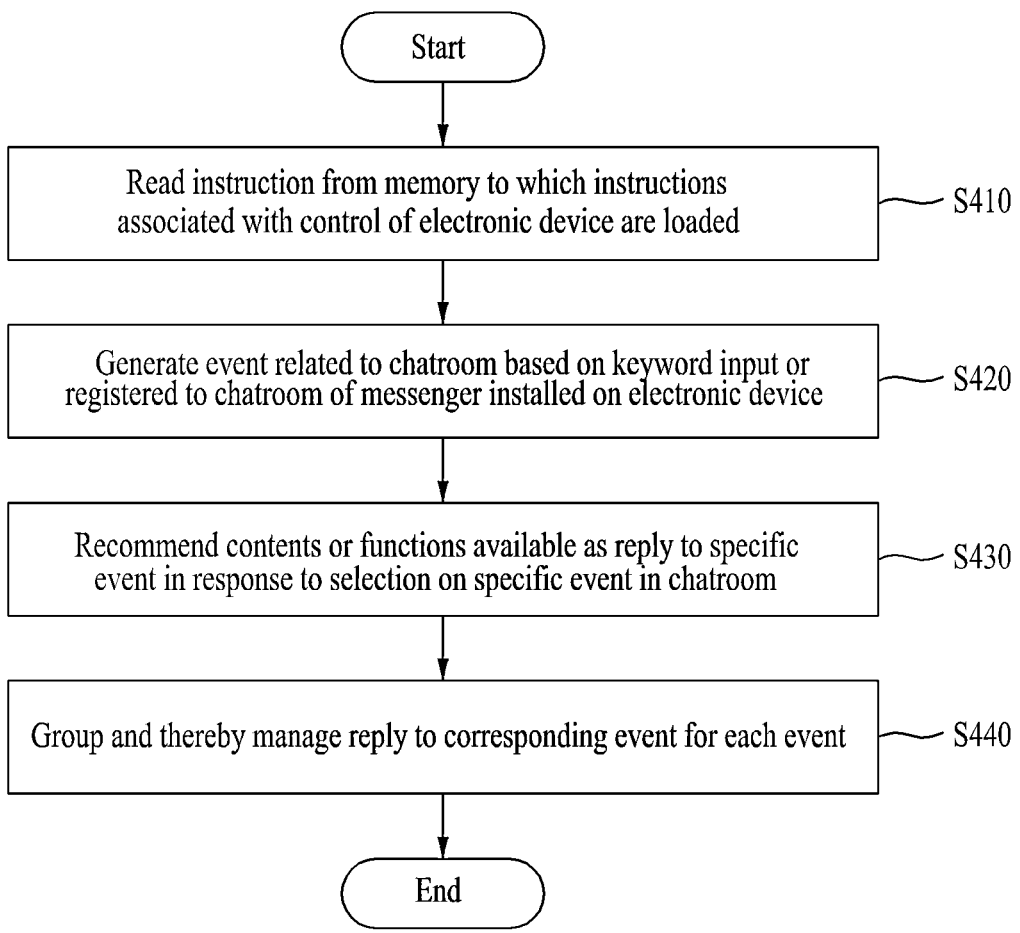
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A message management system implemented as a computer may be configured in the electronic device 110 according to the example embodiment. For example, the message management system may be configured in a form of a program that independently operates or may be configured in an in-app form of a specific application to be operable on the specific application. Depending on example embodiments, the message management system may provide a messaging service through interaction with the server 150.

In response to an instruction provided from an application installed on the electronic device 110, the message management system configured in the electronic device 110 may perform the message management method of FIG. 4.

Referring to FIG. 3, to perform the message management method of FIG. 4, the processor 212 of the electronic device 110 may include an event generator 310, a reply recommender 320, and a message manager 330. Depending on example embodiments, components of the processor 212 may be included in or excluded from the processor 212. Further, depending on example embodiments, components of the processor 212 may be separated or merged for functional representation of the processor 212.

The processor 212 and the components of the processor 212 may control the electronic device 110 to perform operations S410 to S440 included in the message management method of FIG. 4. For example, the processor 212 and the components of the processor 212 may be configured to execute an instruction according to a code of at least one program and/or a code of an OS included in the memory 211.

Here, the components of the processor 212 may be representations of different functions of the processor 212 performed by the processor 212 in response to an instruction (e.g., an instruction provided from an application executed on the electronic device 110) provided from a program code stored in the electronic device 110. For example, the event generator 310 may be used as a functional representation of the processor 212 to control the electronic device 110 to generate an event in response to the instruction.

Referring to FIG. 4, in operation S410, the processor 212 may read a desired instruction from the memory 211 to which instructions associated with control of the electronic device 110 are loaded. In this case, the read instruction may include an instruction for controlling the processor 212 to perform the following operations S420 to S440.

In operation S420, the event generator 310 may generate an event related to a chatroom based on an event related message ("event message") input from a user of the electronic device 110 in a conversation interface (e.g., a chatroom of a messenger) installed on the electronic device 110. Here, the event may indicate a partition unit (e.g., a folder or an album) for collecting and managing messages in the chatroom. For example, the event generator 310 may generate an event based on information input from the user using an event management menu that is configured as a menu in the chatroom. The event management menu may include a menu for registering an event by inputting information (e.g., time information (date and deadline), a text, an image, and/or a video). Here, the event generator 310 may generate an event message by recognizing, as an event message, at least a portion of information input by the user using the event management menu or by processing at least a portion of information input from the user through the event management menu. As another example, the event generator 310 may analyze a message input through a message input box of the chatroom or sent through the chatroom, and if a desired (or alternatively, predetermined) keyword is included in the message, may recognize the message as an event message, and may generate an event based on content of the event message. The event generator 310 may set a list of keywords related to events, such as various congratulations and condolences, festivals, and/or celebrations associated with, for example, birthday, marriage, job, pregnancy, childbirth, anniversary, commemoration, and/or obituary, and may generate an event related to input content in response to a desired (or alternatively, predetermined) keyword being input to the chatroom. As another example, if a message is input based on a desired (or alternatively, predetermined) rule in association with an event through the message input box of the chatroom, the event generator 310 may recognize the corresponding message as an event message, and may generate an event corresponding to message content. For example, as an event related rule, if a message is input with a specific symbol (e.g., !, @, #, etc.) to the message input box, or if a long tag (e.g., a pressing more than a threshold time duration) is input on a specific portion of a screen before or after inputting the message, the event generator 310 may generate an event related to input content. Here, the event generator 310 may set time information of the event based on information registered by the user or a result of analyzing a point in time at which the message is input. Further, the event generator 310 may set a target of the event based on the information registered by the user or the result of analyzing the message content.

In operation S430, in response to a selection on a single specific event among events related to the chatroom, the reply recommender 320 may recommend contents or functions available as a reply to the specific event (e.g., a reply to a specific event message). For example, the user may immediately enter the reply to the specific event in the chatroom. If a specific symbol (e.g., !, @, #, etc.) for an event reply is input to the message input box of the chatroom, the reply recommender 320 may provide a list of events generated in the chatroom, and may receive a selection on a specific event from the user through the list of events. A symbol for event reply may be defined to differ from a symbol for event generation. For example, "!" may be defined as the symbol for event generation and "@" may be defined as the symbol for event reply. Here, in response to a selection on a specific event from a list of events called through a specific symbol, the reply recommender 320 may recommend content or a function available as a reply to the specific event on the chatroom, and accordingly the user may immediately send a reply to the specific event in the chatroom. As another example, the user may access a reply screen of a specific event in the chatroom, and may enter a reply to the specific event on the reply screen. In response to a selection on an event management menu in the chatroom, the reply recommender 320 may provide the generated list of events in the corresponding chatroom. In response to a selection on a specific event from the list of events, the reply recommender 320 may provide a reply screen of the selected specific event. The reply screen may be provided as a layer screen or a separate interface screen on the chatroom. Here, in response to a selection on the specific event from the list of events called through the event management menu, the reply recommender 320 may provide the reply screen of the specific event and may also recommend content or a function available as the reply to the specific event on the reply screen. Accordingly, the user may send the reply to the specific event on the reply screen of the specific event, not on the chatroom.

The list of events called through the specific symbol or the event management menu may include at least a portion of events generated in the chatroom (e.g., events generated during a desired (or alternatively, predetermined) recent period of time or a desired (or alternatively, predetermined) number of events in recent generation order). The events may be sorted in a relay form of timeline (e.g., in chronological order) and thereby provided.

The reply recommender 320 may differently configure content or a function to be recommended based on a type ("event type") of an event selected by the user. The event may be classified into a plurality of event types (e.g., congratulation or condolence) and content or a function desired to be recommended as a reply may be set to be different for each event type. A recommendation target may include any type of contents or functions available as the reply, and may include contents (e.g., texts, images, or videos) and functions for service linkage (e.g., gift or money transfer). For example, the reply recommender 320 may recommend a text "happy birthday" and a service "gift" to an event corresponding to a birthday event, and may recommend a text "my condolence for your loss" and a service "money transfer" to an event corresponding to an obituary event. Therefore, the reply recommender 320 may recognize an event type corresponding to an event specified in response to a selection from the user and then may recommend content or a function corresponding to the recognized event type.

In operation S440, the message manager 330 may assign, to the event, a message input as a reply to the event among messages in the chatroom. That is, the message manager 330 may group a reply to an event for each event generated in the chatroom with the corresponding event, and may manage and provide the same. Here, the message manager 330 may display the reply to the event in association with the corresponding event. The message manager 330 may recognize the event generated in the chatroom as an event message type that is a single message, and may display the generated event as a message in the corresponding chatroom. Here, the message manager 330 may configure an event message and a reply to the event as a single message of an event message type for each event, and may display the same as a single message. In this manner, the event message and the reply to the event may be displayed using a single message of the event message type in real time. Here, the message manager 330 may display the event message with at least one reply (e.g., a most recent reply content or randomly selected reply content among replies to the event) among the replies to the event. That is, in the case of the reply message to the event, the message manager 330 may process the reply message as a message assigned to the corresponding event instead of processing the reply message as an individual message. In response to a selection on a message representing the event in the chatroom, the message manager 330 may provide a reply screen on which the entire replies to the event are verifiable. Here, the reply screen may be provided as a layer screen or a separate interface screen on the chatroom. The entire replies to the event may be sorted in a relay form of timeline (e.g., in chronological order) and thereby displayed on the reply screen.

The message manager 330 may provide a notification of receiving the reply to the event, and may provide an option that allows the user of the electronic device 110 to directly set a notification for each event. For example, if the user of the electronic device 110 generates a corresponding event or sends a message associated with generation of the corresponding event, the message manager 330 may output a reply reception notification in response to receiving a reply to the event. Further, if the user of the electronic device 110 corresponds to a target of a corresponding event, the message manager 330 may output the reply reception notification in response to receiving a reply to the event. That is, if a user i among conversation counterparts included in a chatroom I is set as a target counterpart of an event A with respect to the event A generated in the chatroom I, a notification of receiving a reply to the event A may be provided only to the user i that is the target counterpart.

FIGS. 5 to 8 illustrate examples of a process of registering an event according to at least one example embodiment.

For example, the processor 212 may register an event using an event management menu in a chatroom.

Figure 5:
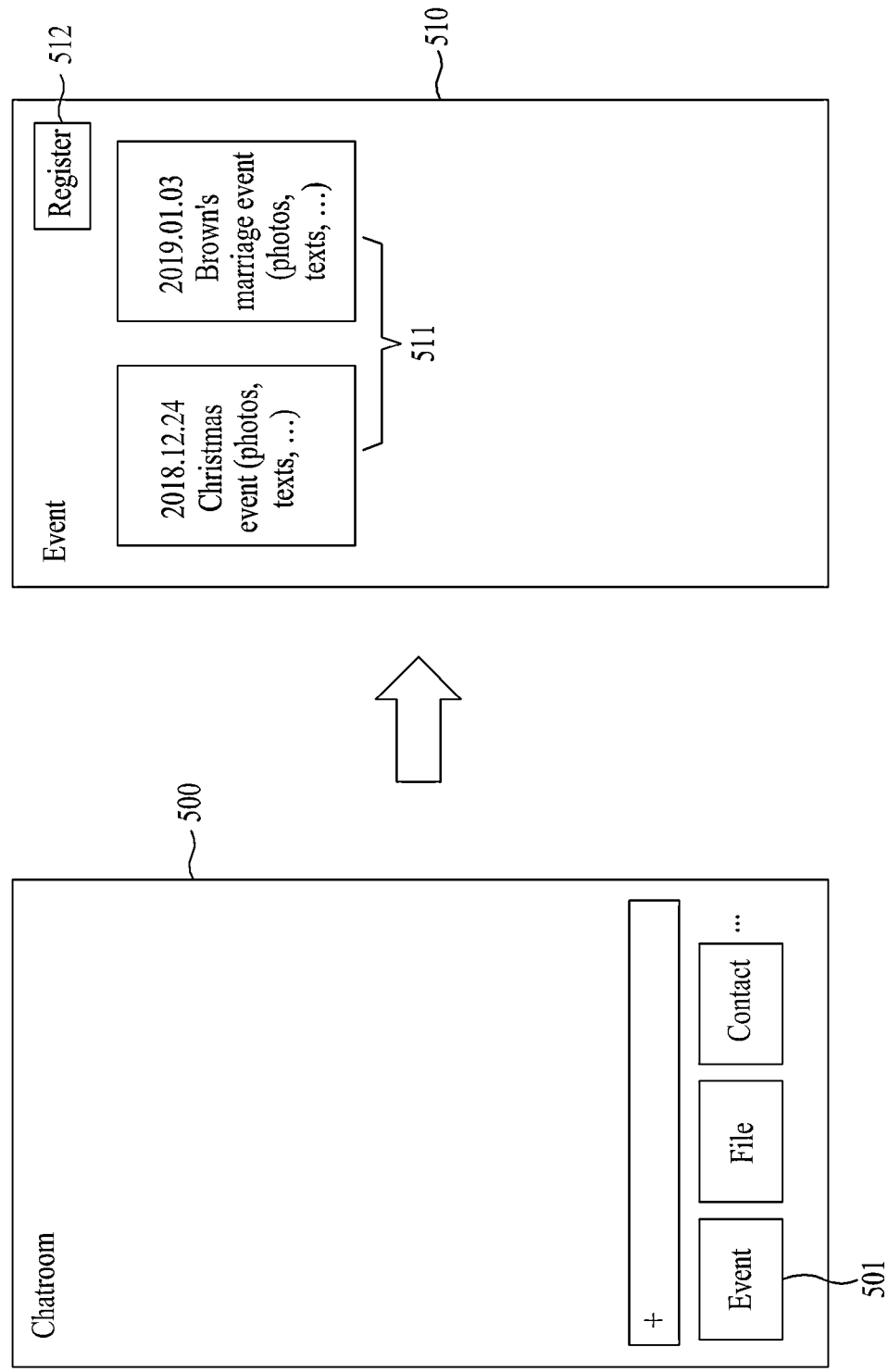
FIGS. 5 and 6 illustrate examples of a process of registering an event according to at least one example embodiment.

Referring to FIG. 5, a menu for managing events (e.g., an event management menu 501) may be included as an in-chatroom menu in a chatroom 500. In response to a selection on the event management menu 501 in the chatroom 500, an event management screen 510 may be provided. The event management screen 510 may include a list 511 of events generated in the chatroom 500 and an event registration menu 512 for registering a new event.

Figure 6:
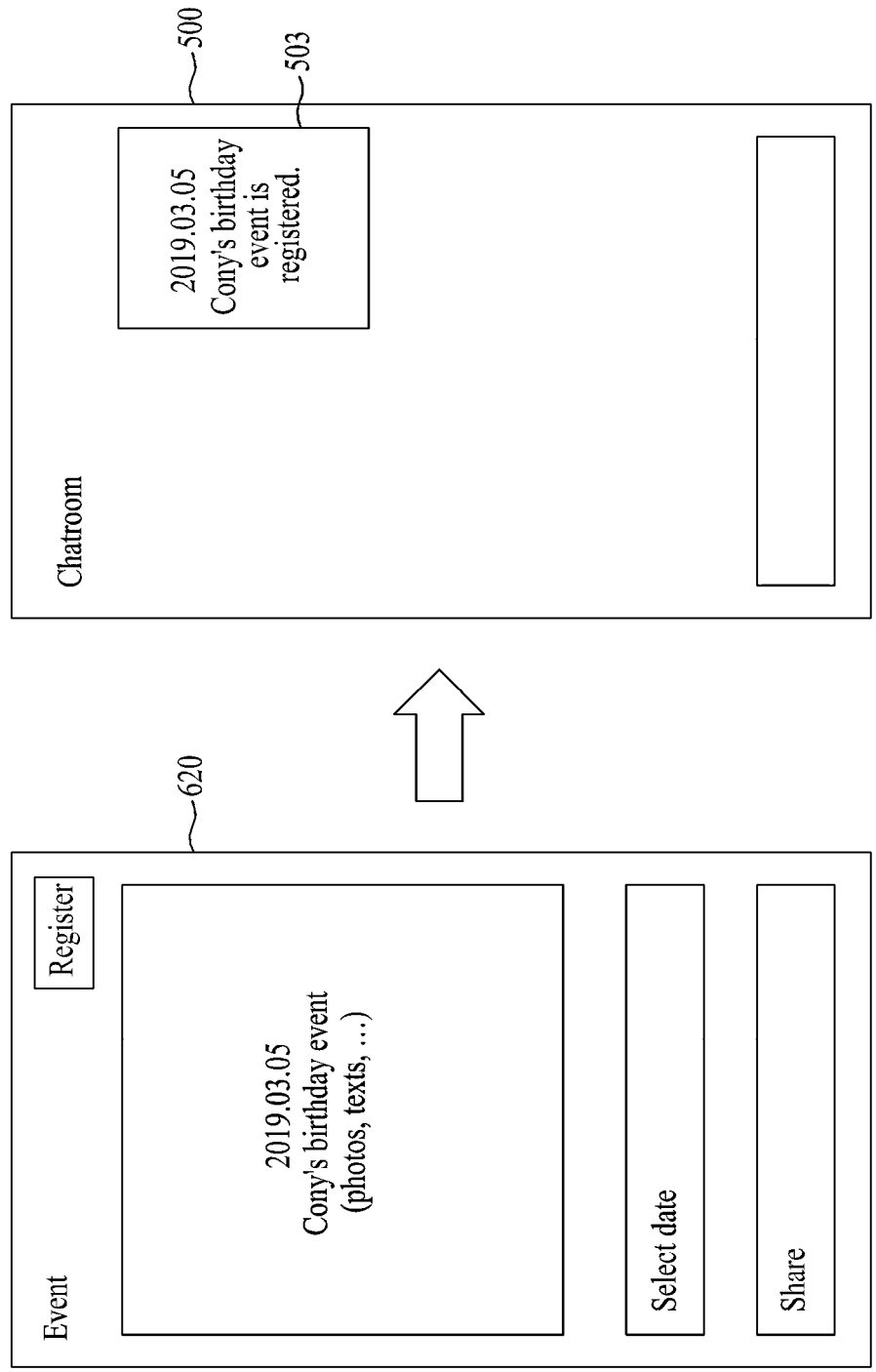

Referring to FIG. 6, in response to a selection on the event registration menu 512 on the event management screen 510, an event registration screen 620 may be provided. Here, the event registration screen 620 may include an interface for inputting information, for example, time information (date, deadline, etc.) of an event, a text, an image, and a video.

The processor 212 may generate an event based on information registered through the event registration screen 620, and may forward information about the event to the server 150.

The server 150 may process the event generated in the chatroom 500 as a single message and may forward the processed event to an electronic device, for example, the electronic devices 110, 120, 130, and/or 140, of conversation counterpart(s) included in the chatroom 500 based on a message unit to which a unique number is assigned. Referring to FIG. 6, the processor 212 may display an event generated in the chatroom 500 as an event message type 503 in the chatroom 500.

Therefore, the processor 212 may generate the event based on information registered by the user through an event registration environment provided from the chatroom 500.

Figure 7:
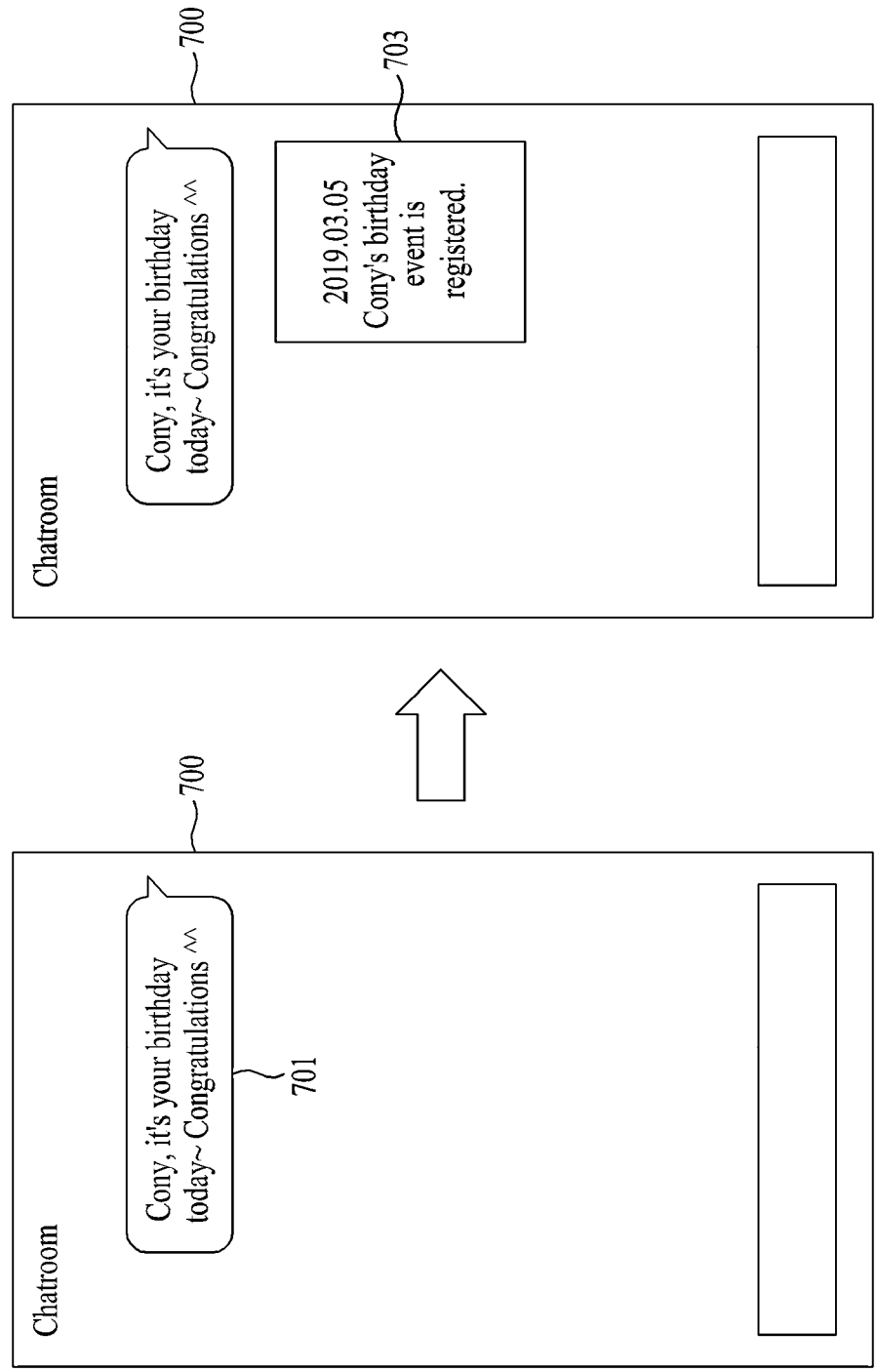
FIG. 7 illustrates another example of a process of registering an event according to at least one example embodiment.

As another example, referring to FIG. 7, if a desired (or alternatively, predetermined) event related keyword is included in a message 701 that is input to a chatroom 700, the processor 212 may generate an event corresponding to message content.

For example, in response to a message "Cony, it's your birthday today~Congratulations^^" input from the user, the processor 212 may recognize an event "birthday" from message content, and may further recognize time information and a target of the event from the message content "today" and "Cony." Accordingly, the processor 212 may recognize "Cony, it's your birthday today~Congratulations ^^" as an event message.

The processor 212 may generate an event based on information recognized from the message content, and may forward information about the event to the server 150.

The server 150 may process an event generated in the chatroom 700 as an event message type that is a single message and may forward information about the processed event to an electronic device, for example, the electronic devices 110, 120, 130, and/or 140, of conversation counterpart(s) included in the chatroom 700 based on a message unit to which a unique number is assigned. Referring to FIG. 7, the processor 212 may display an event generated in the chatroom 700 as a message type 703 in the chatroom 700.

Therefore, the processor 212 may generate an event based on a keyword included in the message 701 in the chatroom 700.

Figure 8:
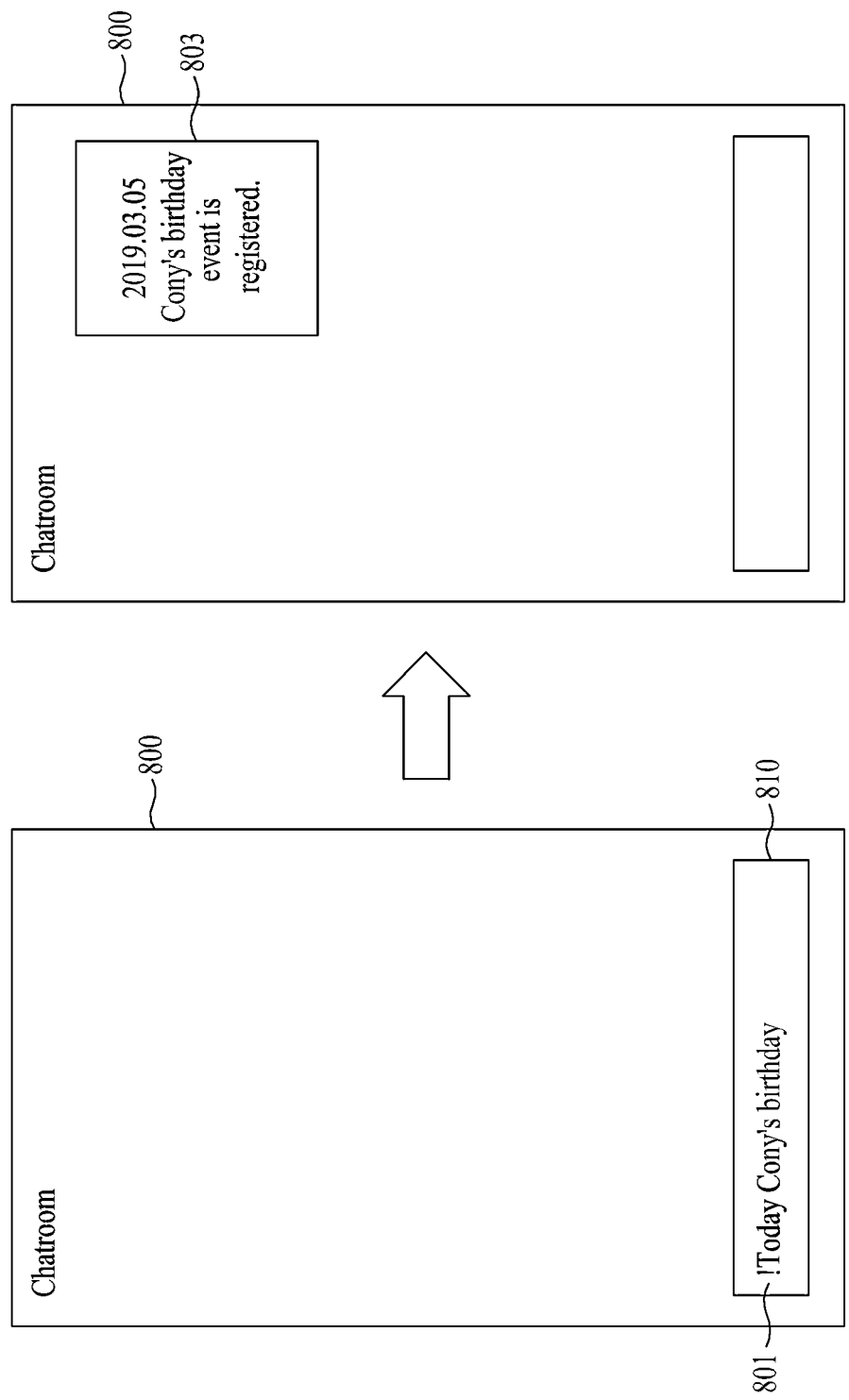
FIG. 8 illustrates another example of a process of registering an event according to at least one example embodiment.

As another example, referring to FIG. 8, in response to an input of a message registration symbol 801 (e.g., "!") assigned or predefined for event registration to a message input box 810 of a chatroom 800 with a message, the processor 212 may recognize the corresponding message as information about an event, and may generate the event corresponding to message content.

For example, if a message "Today Cony's birthday" is input from the user with the message registration symbol 801, the processor 212 may recognize an event "birthday" from message content, and may further recognize time information and a target of the event from the message content "Today" and "Cony."

The processor 212 may generate an event based on information recognized from message content input with the message registration symbol 801, and may forward information about the event to the server 150.

The server 150 may process an event generated in the chatroom 800 as a single message and may forward information about the processed event to an electronic device, for example, the electronic devices 110, 120, 130, and/or 140, of conversation counterpart(s) included in the chatroom 800 based on a message unit to which a unique number is assigned. Referring to FIG. 8, the processor 212 may display an event generated in the chatroom 800 as a message type 803 in the chatroom 800.

Therefore, the processor 212 may generate an event in response to the message input to the message input box 810 of the chatroom 800 together with the message registration symbol 801.

FIGS. 9 to 12 illustrate examples of a process of inputting a reply to an event according to at least one example embodiment.

For example, a reply to an event may be immediately sent in a chatroom.

Figure 9:
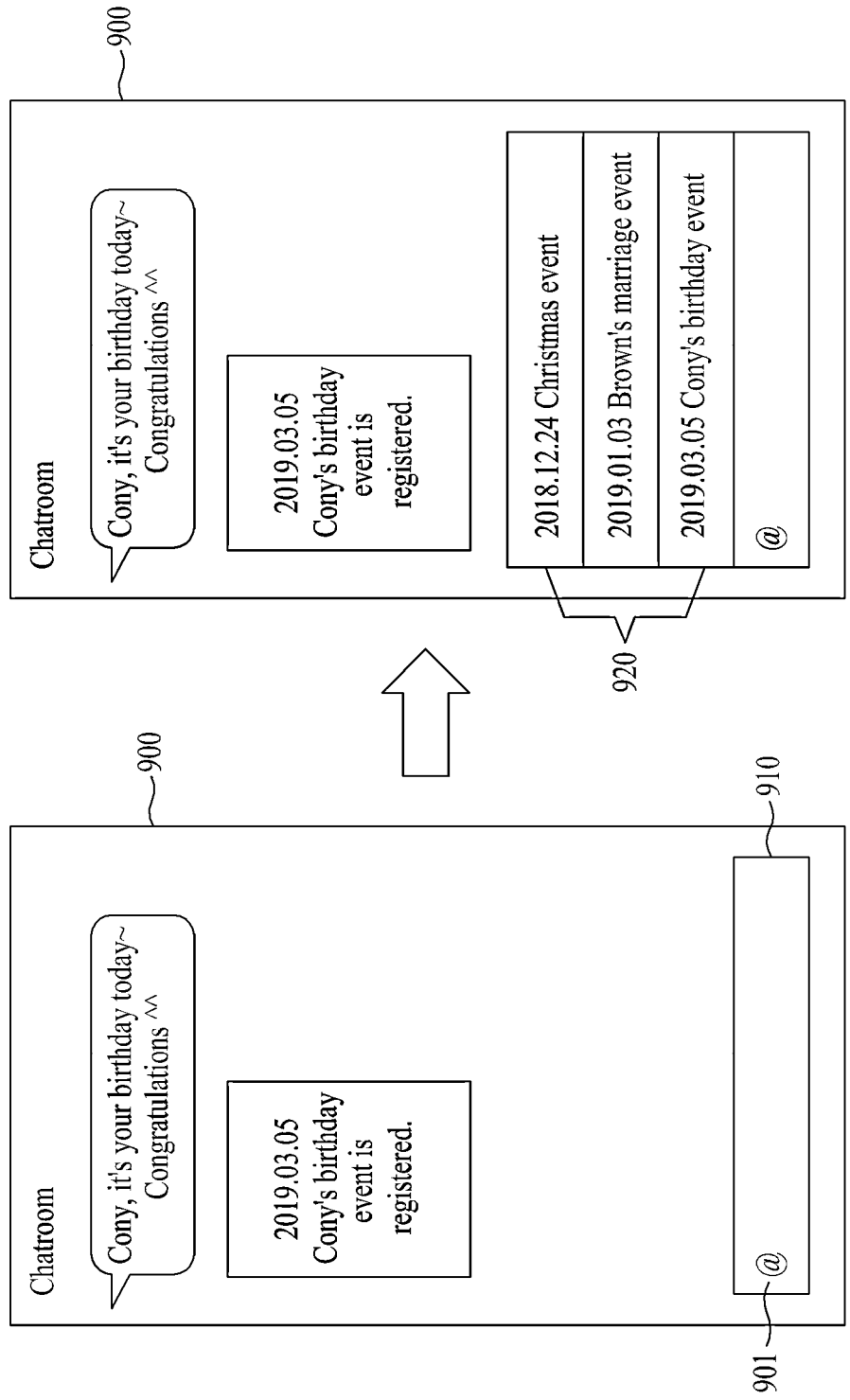
FIGS. 9 and 10 illustrate examples of a process of entering a reply to an event according to at least one example embodiment.

Referring to FIG. 9, in response to an input of a symbol 901 assigned or predefined for an event reply, for example, "@," to a message input box 910 of a chatroom 900, the processor 212 may provide a list of events 920 generated in the chatroom 900. Here, the list of events 920 may include events generated during a desired (or alternatively, predetermined) recent period of time or a desired (or alternatively, predetermined) number of most recent events, in generation order.

Figure 10:
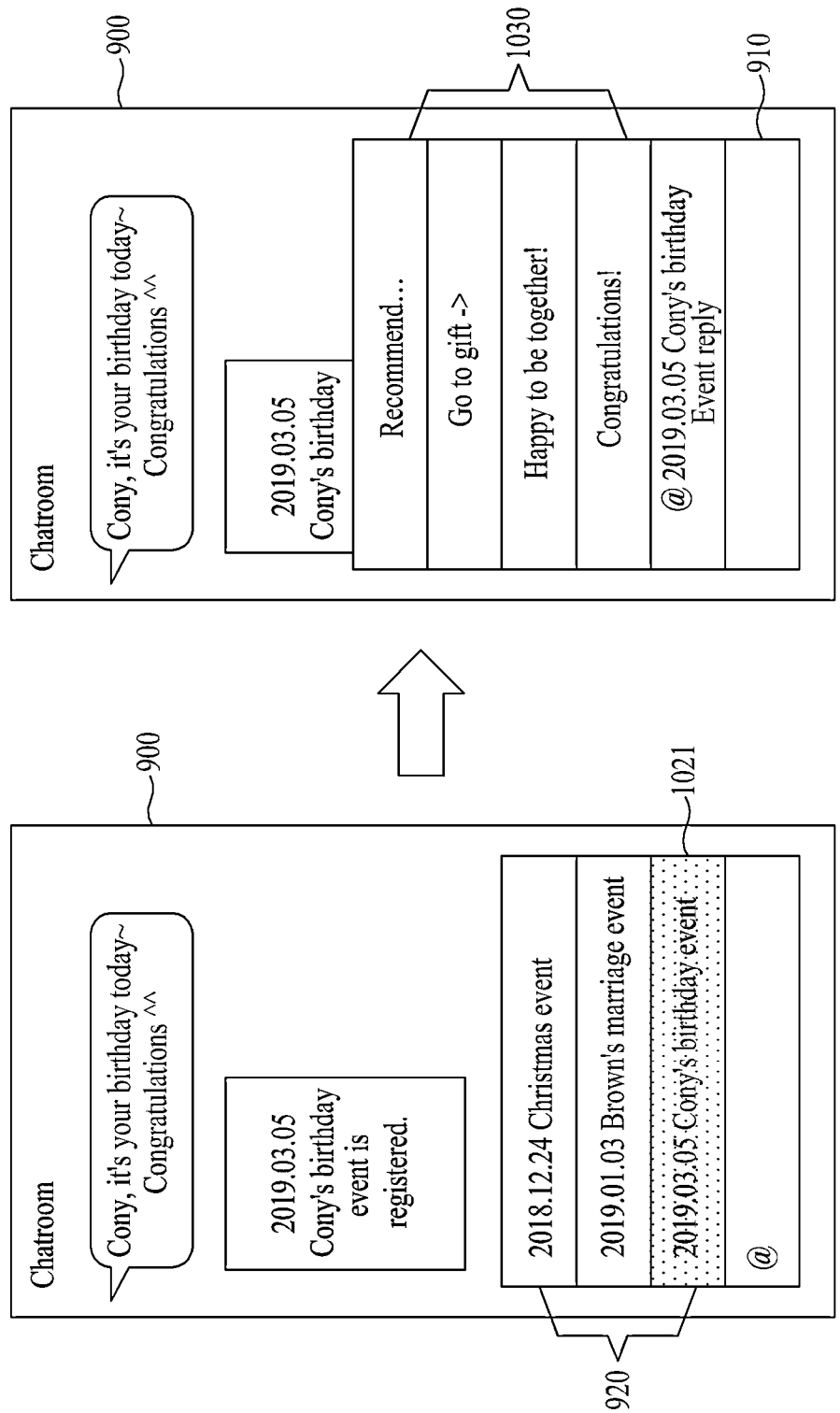

Referring to FIG. 10, in response to a selection on a specific event 1021 from the list of events 920, the processor 212 may display, on the chatroom 900, a recommendation list 1030 that includes contents or functions available as a reply to the specific event 1021. The recommendation list 1030 may include any type of contents or functions available as a reply, and may include contents (e.g., texts, images, or videos), and functions for service linkage (e.g., gift or money transfer). The recommendation list 1030 may be configured to be different based on an event type of an event selected by the user.

The user may enter a reply to the specific event 1021 using the contents or the functions included in the recommendation list 1030, or may enter the reply through the message input box 910 in a state in which the specific event 1021 is selected.

Therefore, the user may call the list of events 920 generated in the chatroom 900 by entering a specific symbol for an event reply into the message input box 910 of the chatroom 900, and may select a specific event from the list of events 920, and then immediately enter a reply to the selected specific event in the chatroom 900.

As another example, although the user does not directly specify an event, content of a message entered through a chatroom input box may be analyzed and a reply may be automatically assigned to a related event or the related event may be recommended based on an analysis result. For example, in response to an input of a reply "Cony, happy birthday" in a state in which a Cony's birthday event is registered, the reply may be automatically assigned to the Cony's birthday event based on a reply analysis result. In some example embodiments, when providing the list of events 920, the list of events 920 may be provided in a state in which the Cony's birthday event is selected as default.

As another example, after an access to a reply screen of a specific event in a chatroom, a reply to the specific event may be sent through the reply screen.

Figure 11:
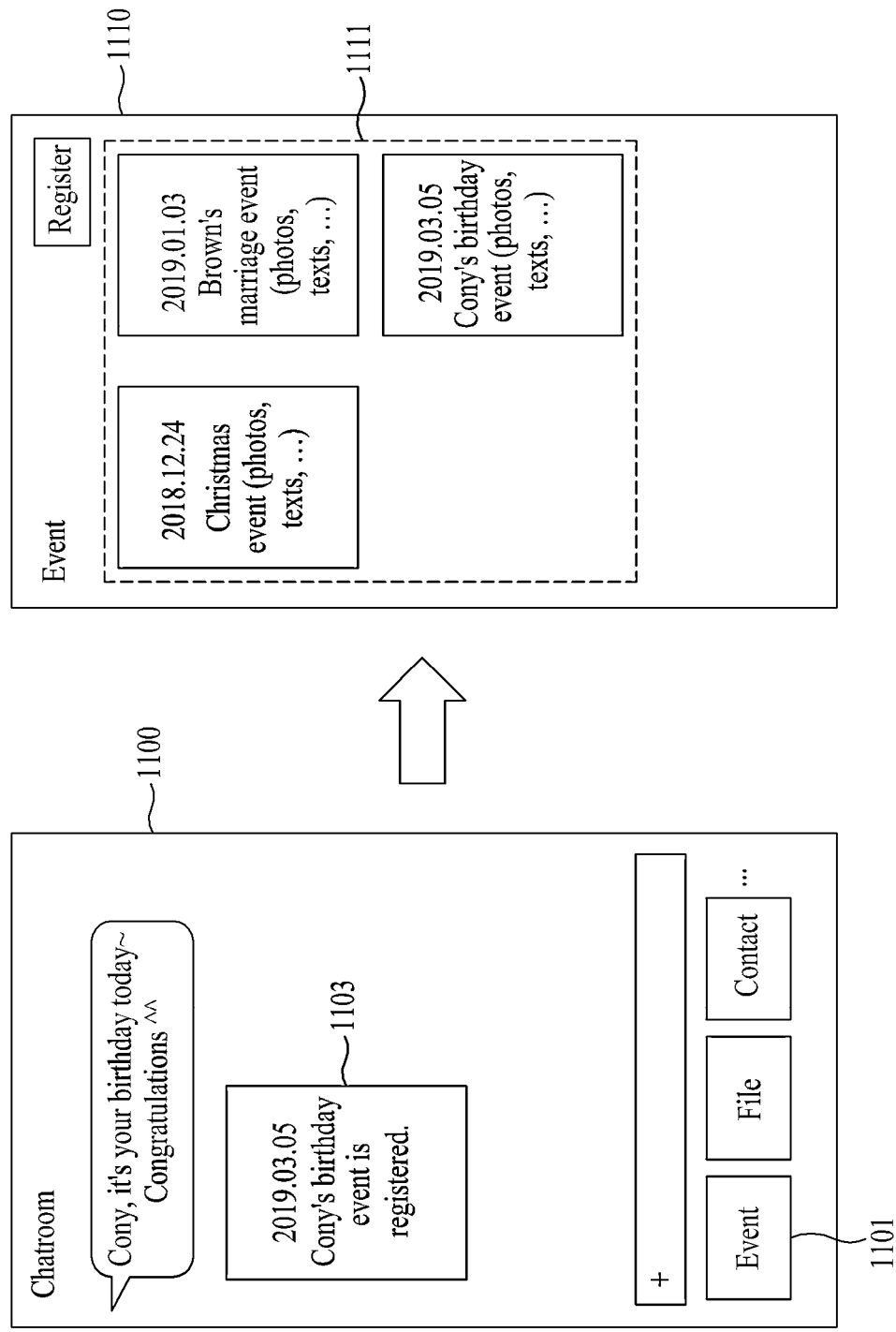
FIGS. 11 and 12 illustrate other examples of a process of entering a reply to an event according to at least one example embodiment.

Referring to FIG. 11, a menu for event management (e.g., an event management menu 1101) may be included as an in-chatroom menu in a chatroom 1100. In response to a selection on the event management menu 1101 in the chatroom 1100, the processor 212 may provide an event management screen 1110. The event management screen 1110 may include a list of events 1111 generated in the chatroom 1100. Here, the list of events 1111 may include events generated during a desired (or, alternatively predetermined) recent period of time or a desired (or alternatively, predetermined) number of most recent events, in generation order. Each item of the list of events 1111 may be configured as a thumbnail for each event. Here, a most recent reply or a randomly selected reply may be configured as a thumbnail.

Figure 12:
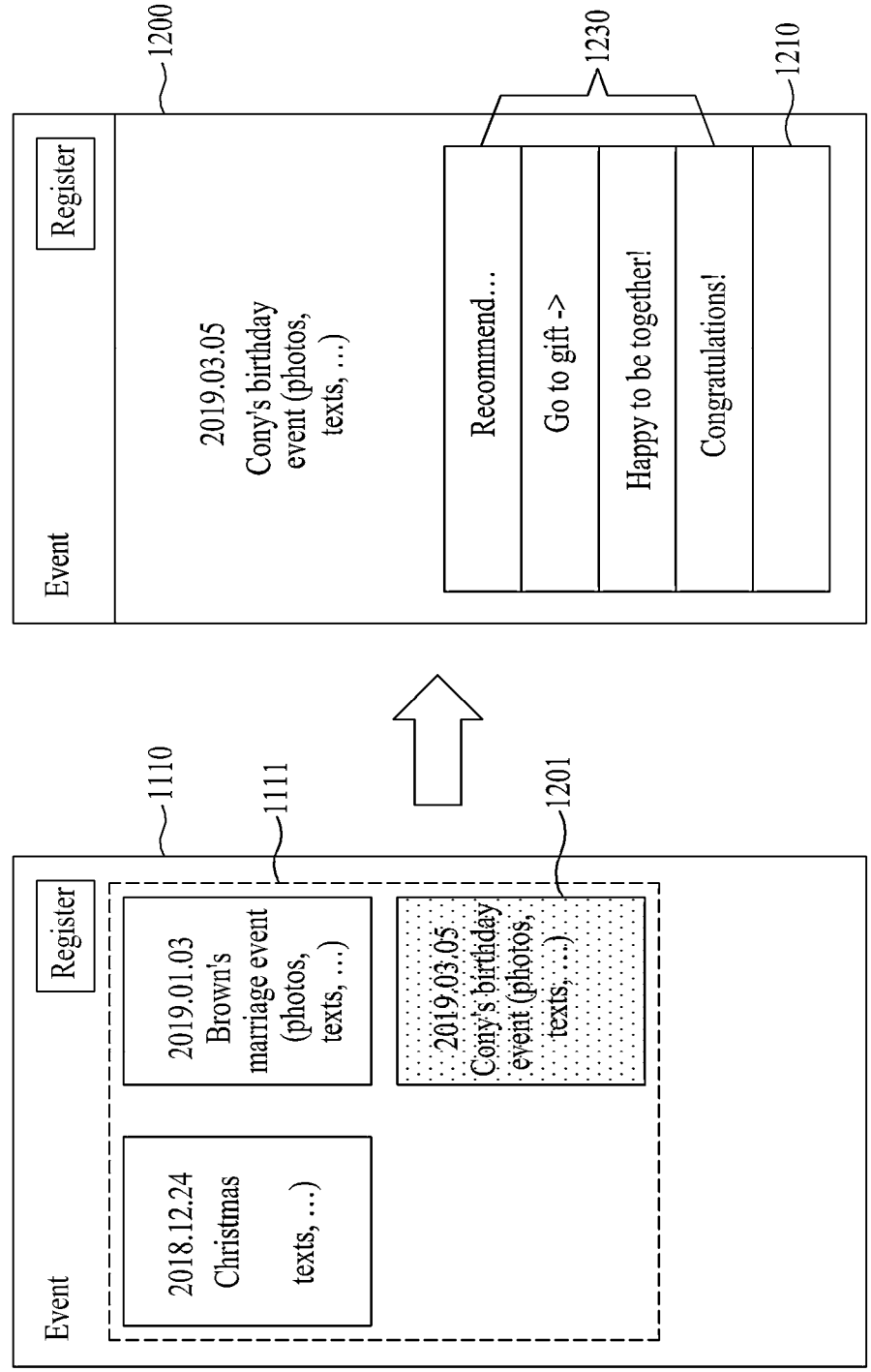

Referring to FIG. 12, in response to a selection on a specific event 1201 from the list of events 1111, the processor 212 may provide a reply screen 1200 of the selected specific event 1201. The reply screen 1200 refers to an interface screen for inputting a reply to the specific event 1201, and may be provided as a layer screen or a separate interface screen on the chatroom 1100 or the event management screen 1110.

Further, in response to a selection on an event displayed as a message type 1103 in the chatroom 1100, the processor 212 may also immediately provide the reply screen 1200 of the corresponding event without using the event management screen 1110.

The processor 212 may provide a recommendation list 1230 including contents or functions available as a reply to the specific event 1201 through the reply screen 1200 of the specific event 1201. The recommendation list 1230 may include any type of contents or functions available as a reply and may include contents (e.g., texts, images, or videos), and functions for service linkage (e.g., gift or money transfer). The recommendation list 1230 may be configured to be different based on an event type of the event selected by the user.

The user may enter a reply to the specific event 1201 using the contents or functions included in the recommendation list 1230, or may enter the reply through a message input box 1210 in the reply screen 1200.

Therefore, the user may access the reply screen 1200 of the specific event 1201 through the menu in the chatroom 1100, and may send the reply to the specific event 1201 on the reply screen 1200.

Although not illustrated herein, the user may refer to reply details about the specific event 1201 through the reply screen 1200. For example, a portion of reply contents (e.g., photos, or texts) sent from users to the Cony's birthday event may be displayed on the reply screen 1200. Here, the user may send a simple reply (e.g., "like" or "sympathize") through a user interface displayed on the reply screen 1200. Further, the user may verify reply information about the specific event 1201 through the reply screen 1200. In other words, the user may verify the reply to the event message using a reply screen, in response to a selection on a message of an event message type representing the event in the chatroom. For example, at least one of profile information of users sending replies to the Cony's birthday event and statistical information (e.g., a number of replies, or a number of gifts) of replies to the Cony's birthday event may be displayed at an upper end of the reply screen 1200.

As described above, according to example embodiments, it is possible to generate an event based on a message input from a chatroom and to manage at least a portion of messages in the chatroom in association with the event.

The systems or apparatuses described above may be implemented using hardware, or a combination of hardware and software. For example, the apparatuses and the components described herein may be implemented using one or more general-purpose or special purpose computers (e.g., a processor, a controller, an arithmetic logic unit (ALU), a digital signal processor, a microcomputer, a field programmable gate array (FPGA), a programmable logic unit (PLU), a microprocessor, or any other device) capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes some specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A message management method implemented by a computer system comprising at least one processor configured to execute computer-readable instructions included in a memory, the method comprising:
generating, by an event generator of the at least one processor, a first event related to a chatroom based on content of a first message received from a first user of the computer system who participates in the chatroom, wherein the first message is displayed in the chatroom and wherein the first event is classified into an event type of a plurality of event types;
displaying, by the at least one processor, a first event message indicating the first event in a chatroom, wherein the first event message is separately displayed from the first message in the chatroom;
receiving, by the at least one processor, a second message from a second user who participates in the chatroom;
identifying, by the at least one processor, the second message, among messages in the chatroom, related to the first event based on the content of the second message;
assigning, by a message manager of the at least one processor, to the first event the identified second message as a reply to the first event, and managing the reply in association with the first event based on the event type; and
displaying, by the at least one processor, the reply to the first event in association with the first event by grouping the reply and the first message.

2. The method of claim 1, wherein the first event message includes at least a target user of the first event and time information associated with the first event.

3. The method of claim 1, wherein the generating comprises recognizing at least one keyword associated with the first event in the first message or the first event being input in accordance with a rule associated with the first event.

4. The method of claim 1, wherein the displaying the reply comprises displaying the first event message and the reply to the first event as a single message.

5. The method of claim 4, wherein the displaying the first event message and the reply comprises:
displaying the first event message together with at least one reply selected from a plurality of replies to the first event.

6. The method of claim 1, further comprising:
providing, by the at least one processor, a reply screen for verifying the reply to the first event in response to a selection on the first event message indicating the first event in the chatroom.

7. The method of claim 1, wherein
the generating comprises recognizing a target user of the first event based on the content of the first message, and
the message management method further comprises providing, by the at least one processor, the target user among users who participate in the chatroom with a notification of the reply to the first event when the reply being received.

8. The method of claim 1, further comprising:
recommending, by the at least one processor, content or a function available as a specific reply to a specific event, in response to a selection of the specific event among events related to the chatroom.

9. The method of claim 8, wherein the recommending comprises:
providing, by the at least one processor, a list of the events related to the chatroom in response to an input of a specific symbol to a message input box of the chatroom; and
displaying, by the at least one processor, a recommendation list available as the reply to the specific event on the chatroom in response to a selection of the specific event from the list of the events.

10. The method of claim 8, wherein the recommending comprises:
providing, by the at least one processor, a reply screen in response to a selection of the specific event in the chatroom; and
providing, by the at least one processor, a recommend list available as the reply to the specific event through the reply screen.

11. The method of claim 8, wherein each of the events related to the chatroom corresponds to one of the plurality of event types, and the recommending comprises recommending the content or the function based on one of the plurality of event types corresponding to the specific event.

12. A non-transitory computer-readable record medium storing instructions that, when executed by the at least one processor, cause a computer system to perform the message management method of claim 1.

13. A computer system comprising:
at least one processor configured to execute computer-readable instructions included in a memory such that the at least one processor is configured to cause the computer system to:
generate, by an event generator of the at least one processor, a first event related to a chatroom based on content of a first message received from a first user of the computer system who participates in the chatroom, wherein the first message is displayed in the chatroom and the first event is classified into an event type of a plurality of event types,
display a first event message indicating the first event in the chatroom, wherein the first event message is separately displayed from the first message in the chatroom,
receive a second message from a second user who participates in the chatroom,
identify the second message, among messages in the chatroom, related to the first event based on the content of the second message,
assign, by a message manager of the at least one processor, to the first event the identified second message as a reply to the first event, and managing the reply in association with the first event based on the event type, and display the reply to the first event in association with the first event by grouping the reply and the first message.

14. The computer system of claim 13, wherein the first event message includes at least a target user of the first event and time information associated with the first event.

15. The computer system of claim 13, wherein the at least one processor is configured to cause the computer system to recognize at least one keyword associated with the first event in the first message or the first event being input in accordance with a rule associated with the first event.

16. The computer system of claim 13, wherein the at least one processor is configured to cause the computer system to display the first event message and the reply to the first event as a single message.

* * * * *